(12) United States Patent
Sondey

(10) Patent No.: US 6,253,600 B1
(45) Date of Patent: Jul. 3, 2001

(54) MODULAR ENGINE DELIVERY APPARATUS

(76) Inventor: Thomas F. Sondey, 9068 Lone Pine, Shelby Township, MI (US) 48317

( * ) Notice: Subject to any disclaimer, the term of this patent is extended or adjusted under 35 U.S.C. 154(b) by 0 days.

(21) Appl. No.: 09/283,515

(22) Filed: Apr. 1, 1999

(51) Int. Cl.[7] .................................................. G01M 15/00
(52) U.S. Cl. .................................. 73/116; 269/17; 269/20
(58) Field of Search .................................... 73/116, 117.2, 73/117.3, 118.1, 119 R; 269/16, 17, 20, 56

(56) References Cited

U.S. PATENT DOCUMENTS

| | | | |
|---|---|---|---|
| 2,669,870 | * | 2/1954 | Bennett ................................ 73/117.3 |
| 2,991,649 | * | 7/1961 | Kinsey ................................. 73/117.2 |
| 3,075,381 | * | 1/1963 | Lelis ..................................... 73/118.1 |
| 3,675,914 | | 7/1972 | Douglass . |
| 3,798,964 | * | 3/1974 | Misseroni ............................ 73/117.2 |
| 3,834,221 | * | 9/1974 | Swis et al. ............................. 73/116 |
| 3,942,363 | * | 3/1976 | Swis et al. ............................. 73/116 |
| 4,174,627 | * | 11/1979 | Swis et al. ............................. 73/116 |
| 4,285,233 | | 8/1981 | Swis . |
| 4,431,103 | | 2/1984 | Sekii . |
| 4,732,036 | * | 3/1988 | Weeder ............................... 73/118.1 |
| 4,846,451 | * | 7/1989 | Squier .................................... 269/17 |
| 4,928,806 | | 5/1990 | Anderson et al. . |
| 4,941,347 | | 7/1990 | Iijima et al. . |
| 5,301,788 | | 4/1994 | Hironaka et al. . |
| 5,509,301 | * | 4/1996 | Takano et al. ......................... 73/116 |
| 5,600,059 | | 2/1997 | Sondey . |
| 5,629,476 | | 5/1997 | Sondey . |
| 5,851,007 | * | 12/1998 | Swartzlander et al. ................ 269/17 |

* cited by examiner

*Primary Examiner*—Eric S. McCall
(74) *Attorney, Agent, or Firm*—Harness, Dickey & Pierce, P.L.C.

(57) ABSTRACT

An apparatus for delivering an engine to a dynamometer is provided with an exhaust system, coolant system, electrical system, and an engine mounting system. The systems decrease the time required to dress an engine while increasing test reliability and the number of engines that can be tested in an engine test room.

20 Claims, 4 Drawing Sheets

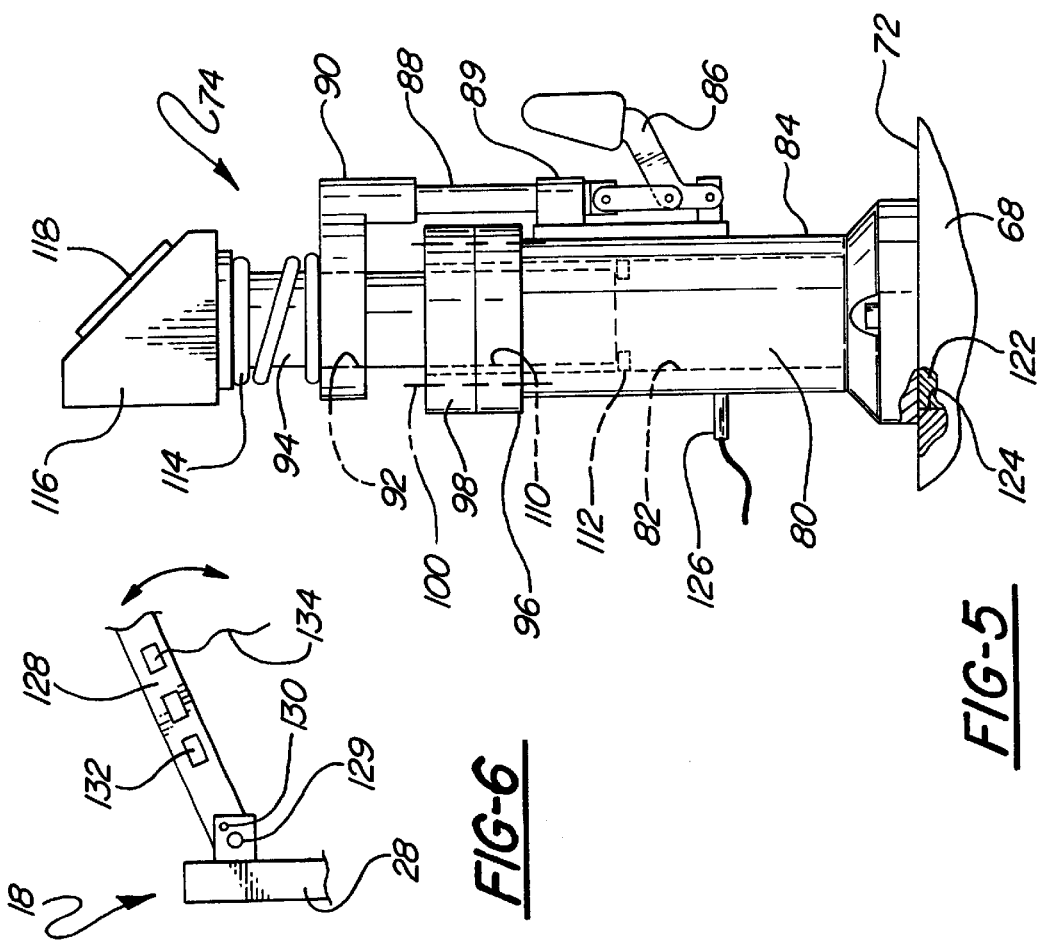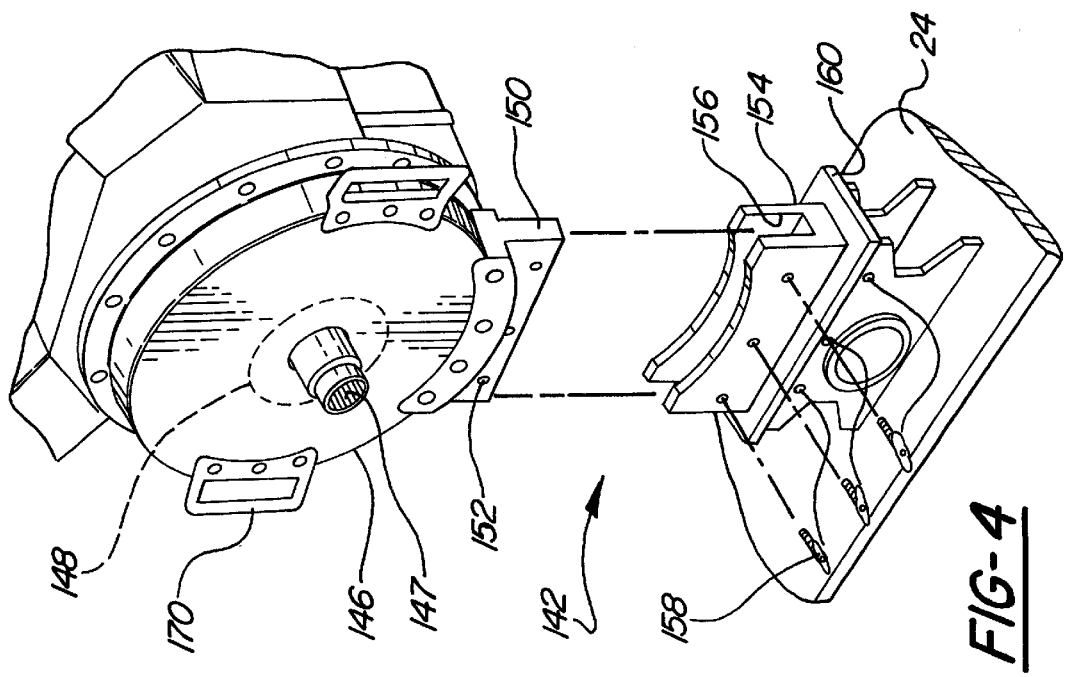

MODULAR ENGINE DELIVERY APPARATUS

FIELD OF THE INVENTION

This invention relates in general to an engine testing device, more specifically, to an improved portable engine testing apparatus having integral fluid, exhaust and electrical systems.

BACKGROUND AND SUMMARY OF THE INVENTION

Engine delivery systems are used to facilitate testing of an engine in an engine dynamometer room. In order to maximize usage of the dynamometer room, it has been desirable to increase the number of engines that can be tested during each shift of operation of the manufacturing facility. When maximizing the number of engines that can be tested during each shift, it is also necessary to maintain reliability of each test. Standardizing the testing process through improved test fixtures is an aspect of improving reliability of the test results.

Conventional engine delivery systems employ a wheeled pallet system that allows an operator to dress the engine in a holding area and then hook up the fluid lines to a vertically arranged fluid manifold. The pallet is then moved to the dynamometer room where the exhaust pipes are connected to the engine exhaust manifold and the electrical system is connected to the engine. The engine is then ready to be tested.

It has become desirable to improve the engine delivery system by integrating a coolant system and an exhaust system with the wheeled pallet assembly. It is further desirable to centerize the electrical connectors and an electrical panel in order to streamline the electrical system on the pallet assembly. Also, it is desirable to provide an improved engine mounting system that allows an engine to be easily and quickly secured to the engine pallet. The aforementioned components should improve reliability of the test data by consistently delivering an engine to a dynamometer which in turn, will test the engine's performance. Such a system should also minimize the number of connections that need to be made in the dynamometer room in order to minimize the test cycle time and set up the engine prior to starting the test. The improved system should also increase the number of engines that can be tested each shift.

According to one aspect of the present invention, an engine delivery system is comprised of a metal frame having a base and an upwardly extending member. Connected to the base is an engine coolant system for delivering fluid to and from the engine, and an exhaust recovery system that includes an adjustable member for engaging the exhaust manifold of the engine. An engine support system secures the engine to be tested to the base. An electrical system includes a pivoting overhead boom that provides a central collecting point for the wires that are connected to a plurality of sensors.

These and other aspects, objects and advantages of the present invention will be further understood by examining the preferred embodiments of the present invention illustrated in the drawings and by studying the detailed description and the claims found below.

BRIEF DESCRIPTION OF THE DRAWINGS

FIG. 4 is a partial perspective view illustrating the bell housing disconnected from the cradle;

FIG. 5 is a side elevational view of the adjustable exhaust connector that transfers exhausts from the engine exhaust manifold to the exhaust collection cavity; and FIG. 6 is a partial side elevational view illustrating the boom in a raised position.

DETAILED DESCRIPTION OF THE PREFERRED EMBODIMENTS

Figure 1:
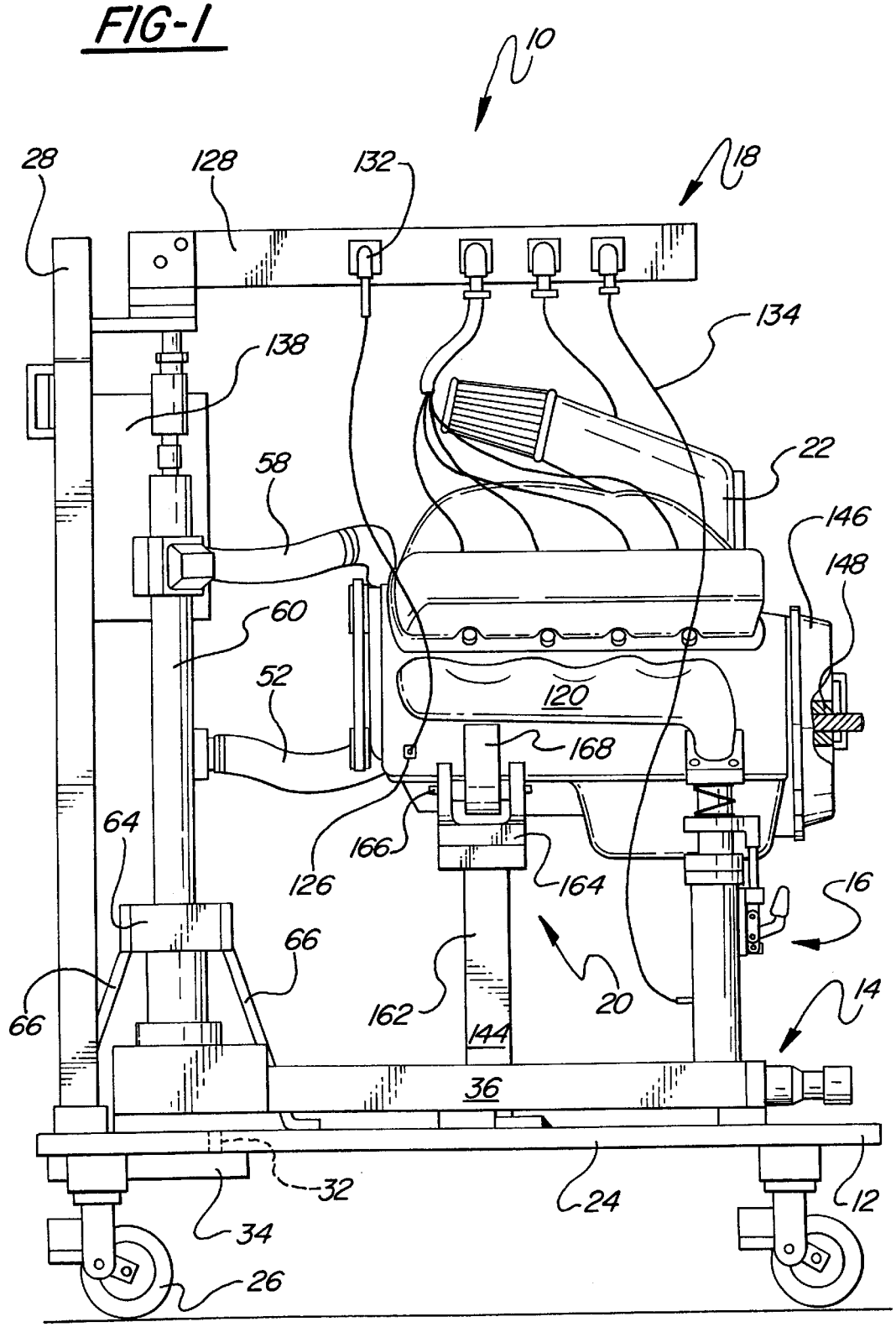
FIG. 1 is a side elevational view of the present invention, showing an engine mounted to a pallet, the exhaust assembly, the coolant system and the electrical system.
Figure 2:
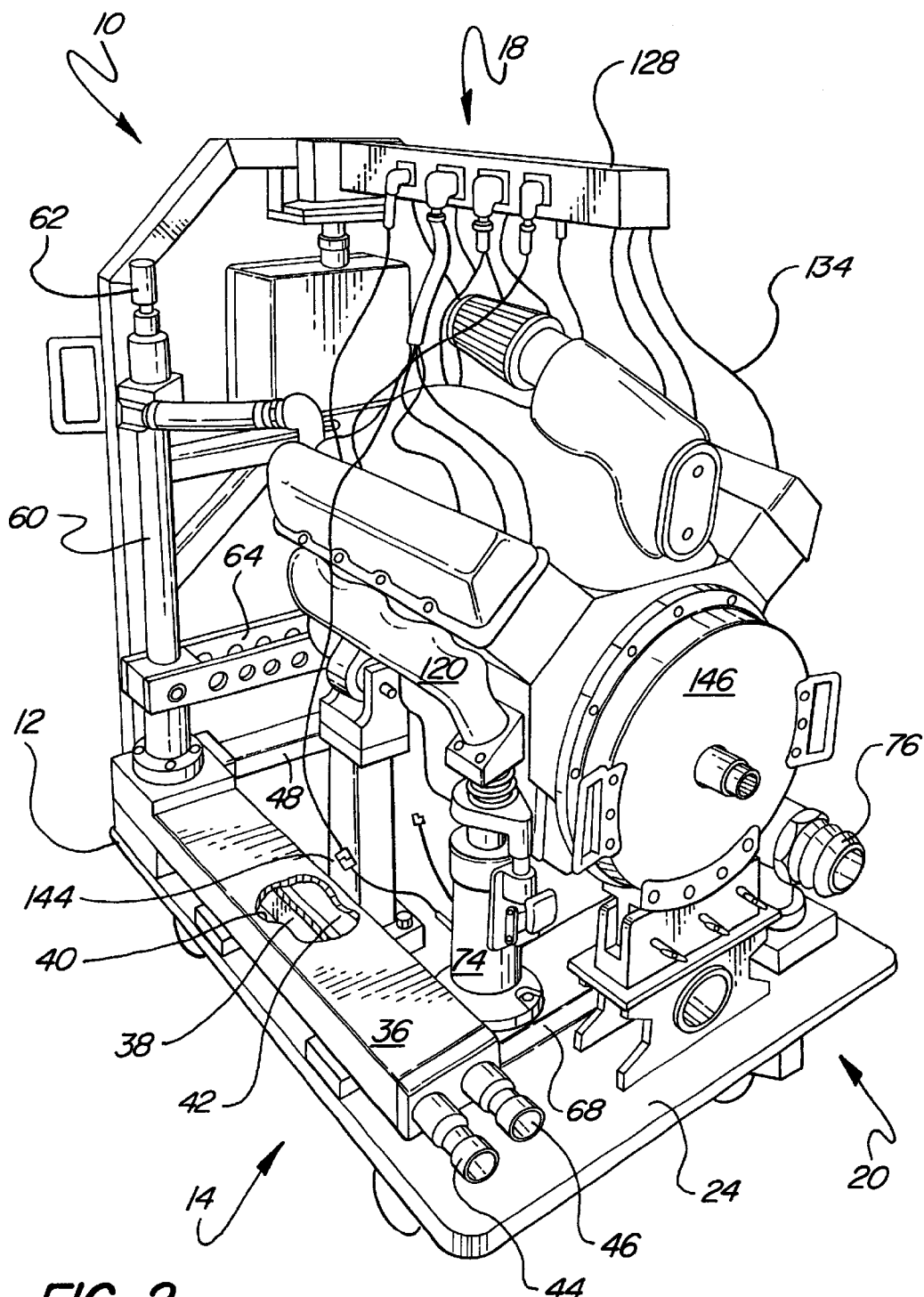
FIG. 2 is a perspective view of the left side of the engine delivery system, illustrating the front engine mount, the exhaust system and a cut out of the manifold showing the inlet and outlet flow chambers.
Figure 3:
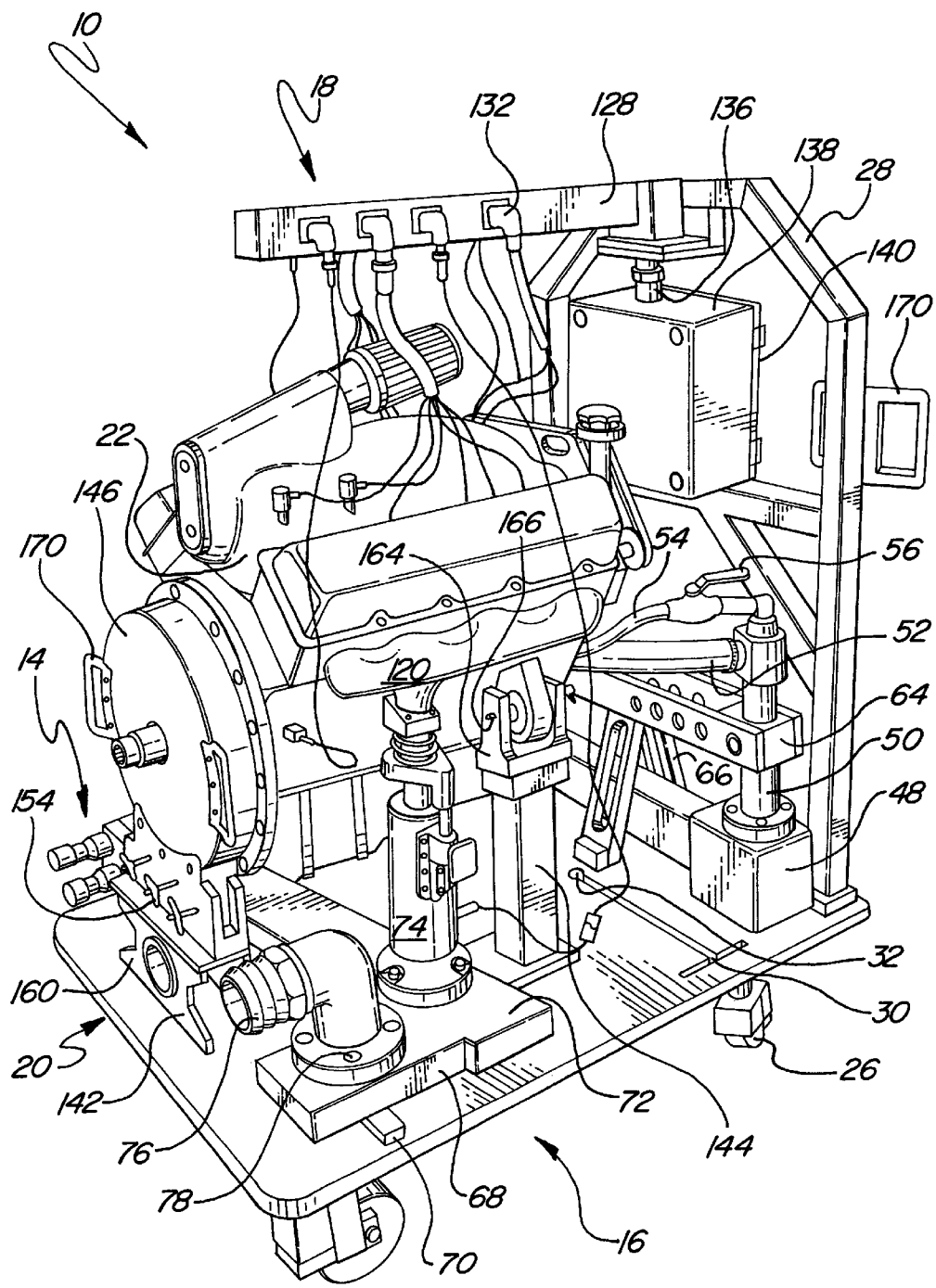
FIG. 3 is a perspective view of the right side of the engine delivery system, illustrating the exhaust system, the electrical system and the engine mounting system.

With reference to FIGS. 1 through 3, an engine delivery system 10 is comprised of a pallet 12, a coolant system 14, an exhaust system 16, an electrical system 18, an engine mounting system 20, and an engine 22. The pallet 12 includes a machined steel base plate 24 with wheel assemblies 26 secured to the underside of the base plate, and a vertically extending frame member 28. A recess 30 is machined in the base plate 24 and delivers spilled fluid to a drain hole 32. A removable pan 34 is connected to the underside of the base plate and is located underneath the drain hole 32 for collecting fluids.

The coolant system 14 provides engine coolant to the engine water jacket and removes the heated coolant from the engine and off of the pallet 12. The coolant system 14 includes a fluid manifold 36 made of corrosion resistant material and has an internal partition 38 which internally separates a first chamber 40 from a second chamber 42. The first chamber is connected to the outlet connector 44 and the second chamber is connected to the inlet connector 46. The connectors preferably are of quick-disconnect type style to allow an operator to easily connect the coolant system 14 to the corresponding coolant system within the dynamometer room. A pipe 48 is connected to the second chamber which in turn is connected at one end to an upwardly extending pipe 50. The pipes are preferably made of corrosion resistant tube steel. Hose 52 supplies coolant to the engine block and hose 54 together with control valve 56 act as an override if the thermostat fails.

Coolant is removed from the engine block through outlet hose 58 to return pipe or column 60 which in turn is in fluid connection with first chamber 40. A pressure safety valve 62 is located at a distal end of the return pipe 60.

A support member 64 extends between pipes 50 and 60 and has a pair of braces 66 extending downward therefrom which are fixed to the base plate 24.

The exhaust system 16 includes an exhaust collection cavity 68 that is spaced apart from the base plate 12 by spacers 70 in order to increase heat dissipation from the collection cavity. The collection cavity is a closed member that is preferably made of steel with three holes 124 extending through the top surface 72 for receiving a pair of adjustable exhaust connectors 74 and an exhaust outlet 76. The exhaust outlet 76 is preferably of a quick-disconnect type in order to allow an operator to easily connect an exhaust line which extends to a scrubber. The exhaust connectors 74 and exhaust outlets 76 are secured via suitable fasteners 78 to the top surface 72.

With reference to FIG. 5, the adjustable exhaust connector 74 includes a column 80 that is preferably made of stainless steel that has an internal bore 82 machined therein. The outside surface of the column 80 has a flat 84 that is operable to receive a clamp 86 having a rod 88 extending through a guide 89. Connected to an upper end of the rod 88 is an upper clamp member 90 with a bore 92 that is operable to receive a corrosion resistant rigid hollow sleeve 94. A shoulder 96 is fixed to the upper end of the column 80 and a retainer plate 98 is secured by fasteners 100 to the shoulder 96. The retainer plate 98 has a reduced internal diameter 110. Retainer members 112, such as screws, are located in the bottom of the sleeve 94 to act as a stop against the underside of retainer plate 98 so that the sleeve 94 does not separate from column 80. A spring 114 is disposed between the upper clamp member 90 and a head 116 which includes an articulating coupling 118. The coupling 118 pivots in order to provide alignment to the centerline of the engine's exhaust manifold. Further, once the spring 114 is loaded by clamp 86, a constant force biases the coupling 118 against the exhaust manifold 120 to create a seal.

The lower end of the column 80 has a lip 122 that is received within the hole 124 of the top surface 72 of the exhaust collection cavity 68. A sensor 126 may be inserted into the column 80 for measuring temperature, gas characteristics, etc. The sensor is connected to the boom which is part of the electrical system 18.

With reference to FIGS. 2, 3 and 6, the electrical system 18 includes a boom 128 that is pivotally connected by pin 129 to the frame 28. The boom 128 can be selectively positioned and held upright by a lock 130 or pin that extends through member 132 and boom 128. A plurality of connectors 132 and associated harnesses are connected to the boom 128. Each harness 134 is in turn connected to various sensors 126 that are positioned throughout the engine and testing apparatus. To assist in the flexibility of the engine delivery system 10, the connectors 132 and associated harnesses can be easily replaced. The boom 128 is preferably made of channel aluminum to allow wires to be routed within the channel to pipe 136 and to electrical panel 138. The panel 138 is preferably water tight and is secured to the frame 28 and has a door 140 and a control panel for arranging the electrical components. It will be appreciated that the boom 128 could be adjustable side to side instead of the adjustable mode disclosed and further the boom could be located off to the side of the frame.

With reference to FIGS. 1 through 4, the engine mounting system 20 includes a front engine mount 142 and a rear engine mount 144. The front engine mount 142 includes a bell housing 146 that covers a simulated fly wheel that has a female spline 147 with capabilities of receiving a male spline for engine starting and testing purposes. The mount 142 also includes a bearing assembly 148 if required. The bell housing 146 is preferably made of machined steel and includes a retaining flange 150 with holes 152. A cradle 154 has a channel 156 that is configured to receive the retaining flange 150 and pins 158 lock the bell housing 146 to the cradle 154 as shown in FIG. 2. The cradle 154 sits on top of a shock mount 160 which is in turn secured to a base plate 24. The pins 158 are connected to the shock mount 160 so that they do not get lost. The shock mount 160 dampens the vibration during extended runs of the engine being tested.

Each rear engine mount 144 includes a support column 162 that is affixed to the base 24 and an upwardly extending member 164 fixed to the column 162. A pin 166 secures flange 168 of the engine to the column 162.

Handles 170 are located on the frame 28 and on the bell housing 146 and allow the operator to move the engine delivery system 10 to the preferred location.

It should be appreciated by those skilled in the art that other variations to the preferred embodiments to the present invention, beyond those mentioned above, are possible. Accordingly, it is to be understood that the protection sought and to be afforded hereby should be deemed to extend to the subject matter defined by the claims below, including all fair equivalents thereof

What is claimed is:

1. An engine delivery system for use in testing an engine, the system comprising:
    a portable pallet for delivering an engine to and from a dynamometer and for supporting an engine, the portable pallet including a base plate and an upwardly extending frame member;
    an exhaust manifold system connected to the portable pallet, the exhaust manifold system including an adjustable exhaust connector operably connected to the engine, an exhaust collection cavity connected to the exhaust connector, a sensing device connected to the adjustable exhaust connector, and an exhaust outlet connected to the exhaust collection cavity;
    an electrical system including a boom extending over the engine and secured to the frame member, a plurality of sensors and connectors connectable to the boom, and an electrical panel secured to the upwardly extending frame member;
    a coolant system connected to the base plate, the coolant system including a fluid manifold to supply coolant to and from the engine; and
    an engine mounting system including a pair of columns extending from the base plate and connectable to the engine, and a cradle for supporting and securing a front portion of the engine.

2. The engine delivery system as claimed in claim 1, wherein the pallet further includes wheels.

3. The engine delivery system as claimed in claim 1, wherein the adjustable exhaust connector includes:
    a column with a base that is secured to the exhaust collection cavity,
    a sleeve slideable within the column and a head mounted to the sleeve,
    a clamping system for holding the sleeve at a predetermined position, and
    a spring disposed between the head and the column.

4. The engine delivery system as claimed in claim 1, wherein the adjustable exhaust connector is selectively positioned to create a seal between an exhaust manifold of the engine and the exhaust collection cavity.

5. The engine delivery system as claimed in claim 1, wherein the adjustable exhaust connector includes means for creating a seal.

6. The engine delivery system as claimed in claim 1, wherein the boom includes a lock and is operable to pivot between a first position and a new position.

7. The engine delivery system as claimed in claim 1, wherein the coolant system includes a flow control valve.

8. The engine delivery system as claimed in claim 1, wherein the fluid manifold includes inlet and outlet pipes with quick disconnects.

9. The engine delivery system as claimed in claim 1, further comprising a housing secured to the engine, the housing having a flange portion that engages the cradle.

10. The engine delivery system as claimed in claim 9, further comprising locking means for securing the housing to the cradle.

11. The engine delivery system as claimed in claim 9, wherein the cradle has a recess that receives the flange.

12. The engine delivery system as claimed in claim 1, wherein each column has an engine receiving portion and a pin.

13. The engine delivery system as claimed in claim 1, further comprising a reinforcement member connected to the base plate and the fluid manifold.

14. An engine delivery system comprising:
- a frame having a base plate and wheels for moving the engine delivery system to different locations;
- a fluid handling system for delivering fluid to and from an engine, the fluid handling system including a manifold with first and second chambers, one of said chambers being connected to an outlet fluid connector and the other of said chambers being connected to an inlet fluid connector, the manifold being secured to the base plate;
- an exhaust recovery system connected to the frame;
- an engine support system mounted to an upper surface of the base plate; and
- an electrical system including a moveable boom that is connected to an upwardly extending member that is secured to the frame.

15. The engine delivery system as claimed in claim 14, wherein the exhaust recovery system includes a chamber, and an adjustable member that is operable to collect exhaust from the engine.

16. The engine delivery system as claimed in claim 14, wherein the fluid handling system includes pipes that are connected to each chamber for delivering coolant to an intake and from an outlet.

17. The engine delivery system as claimed in claim 14, wherein the engine support system includes a front engine support connected to the base plate and a rear engine support.

18. The engine delivery system as claimed in claim 14, wherein the electrical system includes connectors secured to the boom and wires that connect the engine to an electrical panel.

19. A vehicle for delivering an engine to a dynamometer, the vehicle comprising:
- a base with wheels;
- a coolant handling system integral with the base, the system being operable to deliver coolant through the engine;
- a boom extending over the engine, the boom having an arm that articulates from a first position to a second position in order to assist in mounting the engine to the vehicle, the boom being mounted to a vertical support which in turn is secured to the base;
- an exhaust collector integral with the base and connectable to the engine; and
- an engine mount operable to secure the engine to the base.

20. The vehicle as claimed in claim 19, wherein the exhaust collector includes a sealed channel that receives gasses from an adjustable spring biased member that is connected to the channel.

\* \* \* \* \*